Sept. 17, 1968          R. SCHUSTER          3,401,789

CONVEYOR FOR HEAT TREATING CHAMBERS

Filed Sept. 22, 1966          2 Sheets-Sheet 1

INVENTOR

Rolf Schuster

BY *Bailey, Stephens and Huettig*

ATTORNEYS

Sept. 17, 1968     R. SCHUSTER     3,401,789
CONVEYOR FOR HEAT TREATING CHAMBERS
Filed Sept. 22, 1966     2 Sheets-Sheet 2
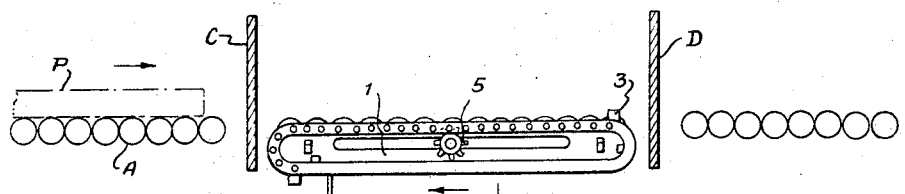
Fig. 3a
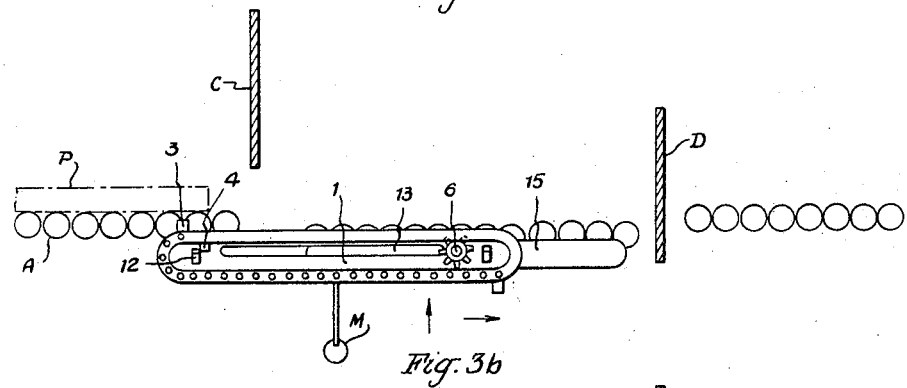
Fig. 3b
Fig. 3c
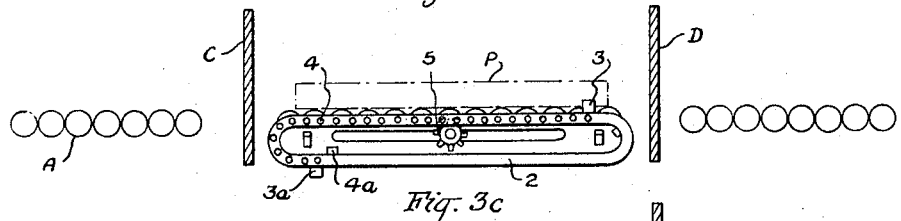
Fig. 3d
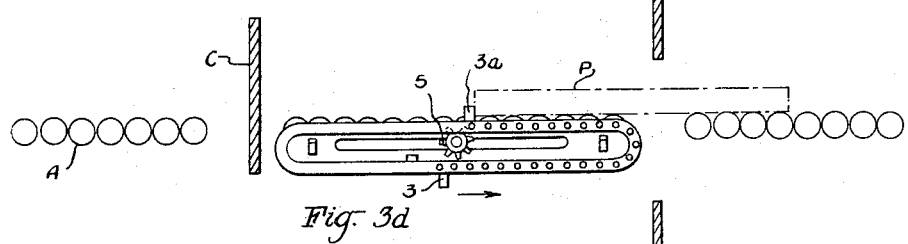
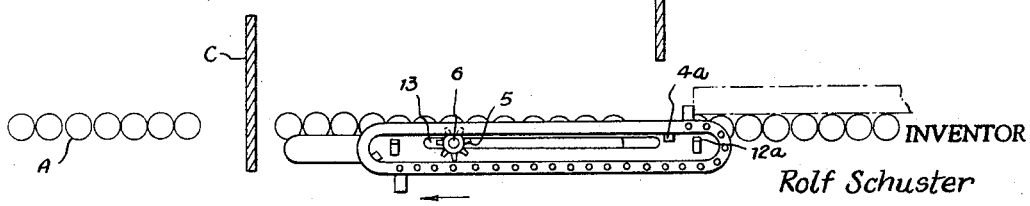
Fig. 3e
INVENTOR
Rolf Schuster
BY Bailey, Stephens and Huettig
ATTORNEYS United States Patent Office 3,401,789
Patented Sept. 17, 1968

3,401,789
CONVEYOR FOR HEAT TREATING CHAMBERS
Rolf Schuster, Hanau am Main, Germany, assignor to Deutsche Gold- und Silber-Scheideanstalt vormals Roessler, Frankfurt am Main, Germany
Filed Sept. 22, 1966, Ser. No. 581,363
Claims priority, application Germany, Sept. 25, 1965,
D 48,295
5 Claims. (Cl. 198—173)

ABSTRACT OF THE DISCLOSURE

Between the outer rollers of a conveyor for transferring hot workpieces is an endless conveyor roller chain carrying a thrust member. This chain can be lowered, moved longitudinally and then raised to bring the thrust member up to engage the workpiece. The chain is then driven to push the workpiece across the conveyor.

---

This invention relates to a conveyor for a heat treating chamber and in particular to a roller chain conveyor for putting workpieces into the chamber and then removing them.

Heat treating chambers are composed of a charging conveyor, a high temperature chamber or zone, and a cooling, annealing or quenching chamber or zone. When operating in a protective gas atmosphere, the individual zones are separated from one another by gas-tight doors. As the workpieces are passed through the apparatus, one door is always open.

Push and pull chain conveyors have been used which are driven by a motor and drive gears. The free ends of the chains are stored in an oil bath or beneath the furnace. The chains are moved by wheels through guide rails in the treatment zones and engage the charging conveyor by means of cams and sprockets.

Since the chains stay in the high temperature zone for some time, they must be constructed of heat-resistant material having a large cross-section in order to have sufficient stability. Such a chain, however, requires a drive wheel of large diameter as well as for the guiding rollers.

In an installation of this sort having, for example, three doors and at least two chain systems, each system requires two drive and guide wheels. Such wheels require an installation space of approximately 1 meter.

Also known are hydraulic and mechanical conveyors in front of, below or behind the apparatus in which the conveyor cam or sprocket is moved in a guide rail through the zones.

All these apparatuses have the disadvantage in that bending stresses are exerted on the drive parts due to the bridging of the conveyor cams. Moreover, a breakdown is difficult to find and correct because the conveyor is installed in a gas-tight furnace. Also, if three gas-tight doors in an automatic heat treating oven must be gone through, then four conveyors are necessary.

The object of this invention is to produce a conveyor which can transport the workpiece by at least twice the length of the conveyor and using a conveyor chain which, during the pulling or pushing of the workpiece, is always subjected to a pull. It is also possible that the conveyor remains in its rest position within the cold portion of the apparatus. Specifically, the conveyor is composed of an endless link roller chain provided with one or two thrust members mounted with its upper reach on the carriage and with its lower reach carried on guide rails mounted in a frame. The driving sprocket which engages the upper reach of the conveyor chain has a drive shaft which extends through the side plates of both the carriage and the frame.

The distance between the doors of the treatment chambers are, in this case, on each side bridged by means of the movement of the chain carriage over at least one-half the length between the doors.

Figure 1:
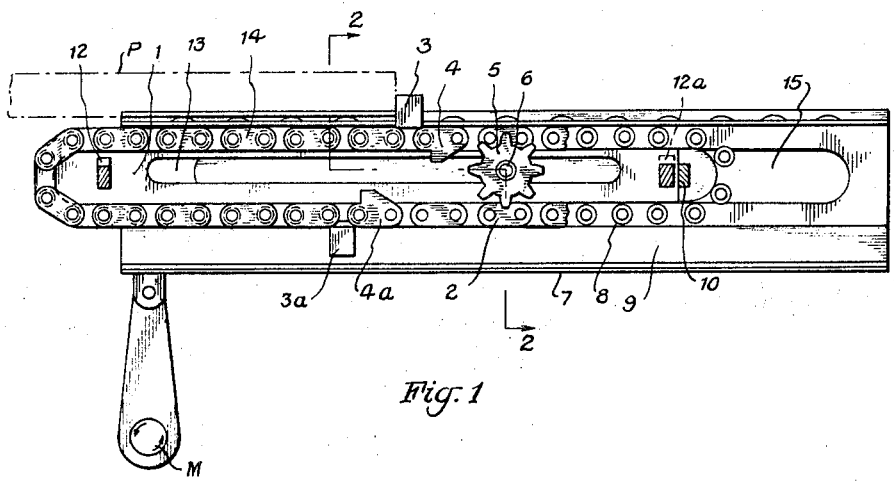
Figure 2:
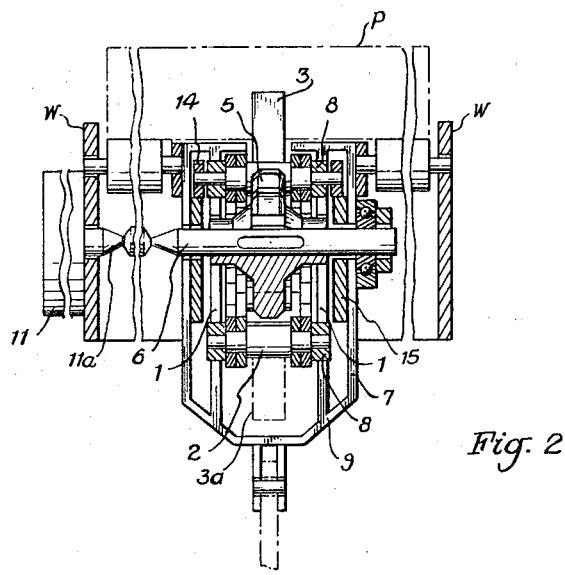

The means by which the objects of the invention are obtained are described more fully with reference to the accompanying drawings in which:

FIGURE 1 is a side view of the conveyor;
FIGURE 2 is a cross-sectional view taken on the line 2—2 of FIGURE 1; and
FIGURES 3a to e are schematic views showing the movements of the conveyor.

The conveyor is composed of a chain carriage 1 carrying an endless link roller chain 2 to which are attached thrust members 3 and 3a and stop lugs 4 and 4a. Between the side plates of the carriage is a drive sprocket 5 which engages the upper reach of the chain and is driven by a drive shaft 6 which is journalled in both side walls of the frame 7. The outer rollers 8 of the chain travel on the upper edges of the side plates of the carriage 1 and in the lower reach of the chain the rollers ride on rails 9 in the frame 7. Chain tensioning means 10 are mounted on the side plates of the carriage.

An electric or hydraulic motor 11 is mounted either on the housing W or on the side plates of the frame 7 and connected by a cardan joint 11a to drive shaft 6.

As shown in FIGURE 3a, the workpiece P is in an oven zone on the left and is supported on rollers A. The conveyor of this invention is mounted in the cold zone between doors C and D. The conveyor is first lowered by the motor M until the member 3 is low enough to pass beneath workpiece P. Door C is then opened. Sprocket 5, which engages chain 2, drives the chain to the left, FIGURE 3b, while at the same time the chain rolls on stationary rails 9 and moves the carriage 1 to the left. This movement is similar to that of a vehicle having endless tracks. Movement is stopped when stop lug 4 meets stop lug 12 and with member 3 beneath workpiece P as shown in FIGURE 3b. Longitudinal slots 13 in the side plates of carriage 1 limit the movement of the carriage with respect to drive shaft 6 because of stop lugs at the end of the slot. The conveyor is then raised until thrust member 3 engages in a notch in workpiece P, note FIGURE 3c.

Sprocket 5 is then reversed in driving direction and member 3 pulls workpiece P onto chain 2, while the conveyor is returning to the cool zone as in FIGURE 3c, and door C then closed.

After an appropriate period, door D is then opened, FIGURE 3d. The conveyor is driven to the right and member 3 drops out of the notch as the member is lowered by moving downwardly around the curved end of the conveyor. At the same time, thrust member 3a moves from the lower to the upper chain reach, FIGURE 3d, and pushes against workpiece P.

At the same time, carriage 1 is also moving to the right in the same manner it was moved to the left in FIGURE 3b. In FIGURE 3c, the workpiece is shown pushed onto the outlet grate. The carriage is stopped when lug 4a meets stop lug 12a and the drive shaft 6 hits the end of longitudinal slot 13.

Following this, sprocket 5 moves thrust member 3a and carriage 1 back to its center position at which members 3 and 3a are in the lower left and upper right positions, respectively, as shown in FIGURE 3a. The movement of members 3 and 3a along the center of the carriage is aided as shown in FIGURE 1 by additional rollers 14 connected to the links of chain 2, which rollers ride on the tracks 15 mounted in the frame 7. Tracks 15 are on the top edges of the side plates of frame 7 which are of the same size and shape as the side plates of the carriage 1. It is only when the thrust members 3a have returned to the previous position of the thrust member 3 that the carriage can be moved out of its center position.

When the conveyor is used for moving a workpiece in and out of the same door, then the stop lug 4a, the rollers 14 and the tracks 15 can be omitted.

When the conveyor is used both to move the workpiece into an oven and then pull it out again, then the thrust member 3 need not be driven to its final position, that is to the stop position of lug 4.

When a workpiece is being moved into an oven, the drive for the conveyor must be cut off a little sooner in order to permit the thrust member to coast to a rest position until stopped by the lug 4 and the stop 12.

The starting and stopping of motor 11 at its end and center position is easily accomplished by limit switches which are controlled by the rotations of shaft 6. This is possible because the same number of rotations are required for the drive sprocket 5 in order to obtain the stop positions of the thrust members.

Having now described the means by which the objects of the invention are obtained, I claim:

1. A conveyor for a heat treatment oven comprising an endless conveyor roller chain having an upper reach and a lower reach, at least one thrust member joined to said chain, at least one chain stop lug joined to said chain, a conveyor frame having guide rails, a conveyor carriage having side plates and being slidably carried by said frame above said guide rails, outer roller means on said roller chain for mounting the upper reach of said roller chain on said carriage and for carrying the lower reach of said roller chain on said guide rails, a drive sprocket mounted in said carriage between said side plates and in engagement with said upper reach, and a drive shaft joined to said sprocket and extending through one of the side plates.

2. A conveyor as in claim 1, further comprising slot means in said side plates through which said drive shaft extends and for permitting said carriage to move one-half of its length to either side of said shaft.

3. A conveyor as in claim 2, further comprising stop means on said side plates engageable with said chain stop lug for limiting the final position of said thrust member.

4. A conveyor as in claim 3, further comprising side walls on said frame of the same size and shape as said side plates on said carriage and having top edges forming centering tracks, and second rollers attached to said chain and riding on said tracks for centering said carriage during movement of said chain.

5. A conveyor as in claim 4, further comprising lift means joined to said frame for raising or lowering said frame a distance approximately that of the height of said thrust member.

References Cited

UNITED STATES PATENTS 2,362,208  11/1944  Langen _____ 198—221

EDWARD A. SROKA, *Primary Examiner.*